May 7, 1968  M. E. GERARD  3,382,328
HIGH VOLTAGE POWER PICKOFF FOR A MOVING ELECTRON BEAM GUN
Filed Nov. 29, 1966  2 Sheets-Sheet 1

INVENTOR.
M. E. GERARD
BY
George E. Pearson
ATTORNEY

May 7, 1968 M. E. GERARD 3,382,328
HIGH VOLTAGE POWER PICKOFF FOR A MOVING ELECTRON BEAM GUN
Filed Nov. 29, 1966 2 Sheets-Sheet 2

INVENTOR.
M. E. GERARD
BY
George E. Pearson
ATTORNEY

United States Patent Office 3,382,328
Patented May 7, 1968

3,382,328
HIGH VOLTAGE POWER PICKOFF FOR A
MOVING ELECTRON BEAM GUN
Milan E. Gerard, Chula Vista, Calif., assignor to Rohr
Corporation, Chula Vista, a corporation of California
Filed Nov. 29, 1966, Ser. No. 597,752
10 Claims. (Cl. 191—12)

This invention relates generally to electron beam welding apparatus and more particularly to a sliding contact and coacting bus bar type of power pickoff for transfer of the high voltage filament and beam power to a moving electron beam gun.

Conventionally, electron beam welding is performed on a workpiece within a vacuum chamber work enclosure by means of an electron beam gun which is maintained in a fixed position within the work chamber, the workpiece being moved beneath the gun so as to cause relative movement between the workpiece and the electron beam which thus traverses along the region of the workpiece to be welded. Workpiece sizes are thus limited to those which not only will fit in the chamber but which can be moved beneath the stationary gun during welding. Weight of the workpiece may also be a factor in limiting the capacity of the electron beam welder since table structure, drive mechanisms, and the like, must support, position and move the assembly within close tolerances during the welding. These difficulties may be largely obviated by moving the electron beam gun with respect to a fixed workpiece. For example, the size of a fixed workpiece that can be welded by a moving electron beam gun may be more than doubled without increasing the chamber size or pumping requirements.

Moving the electron beam gun, however, while solving the foregoing problems introduces still others. The principal problem lies in transmitting power to the moving gun for filament heating and beam generation. Since elevated voltages of the order of 60 kv. are required to operate commercial electron beam guns, electrostatic and vapor shielding requirements are critical and must be met. A shielded high voltage insulated cable to the gun will meet the shielding requirements, but its inordinate stiffness and unwieldiness renders the same utterly unsuitable for use in transmitting power to the moving electron beam gun, particularly where the desired length of traverse of the gun is considerable.

In accordance with the present invention, an electron gun movement along X–Y–Z axes is contemplated, and the foregoing difficulties are obviated by the provision of flexible cable connections between the gun and a sliding power pickoff which moves with the gun as the same traverses along the X-axis while permitting traverse, as required, along the orthogonally disposed Y and Z axes. More specifically, copper bus bars disposed within a tubular shielding enclosure are connected to the high voltage filament and beam power supply, and a power pickoff shoe extended into sliding engagement with the bus bars through an elongated clearance slot in the tubular enclosure connects to the gun through flexible cable connections. Voltage differential between the bus bars is low, being of the order of less than 25 volts DC. The current flow through the bus bars, however, may be high, being of the order of up to 60 amperes. Thus, insulation required between the bus bar elements may be minimized while cross sections of current carrying elements must be maximized.

Other problems inherent in the operation of a moving electron beam gun having sliding power connections lie in controlling arc discharge and maintaining a steady beam. The tendency of the gun to malfunction in this respect due to operation of the sliding contacts is minimized by rounding and polishing external surfaces and corners of the power pickoff unit wherever possible thereby to minimize static field concentrations, and by making the size and position of the clearance slot for the sliding contact sufficient to render the shield tube adequate to optically shield the bus bars against vapors generated in the welding operation. Standoff insulators are used, moreover, to mount the pickoff assembly within the vacuum chamber to thereby isolate the high 60 kv. potential from ground. Provision is made, furthermore, for improvements in the sliding contacts to avoid arcing and galling conditions at the contact points which introduce fluctuations in both the beam and filament currents.

It is an object of the present invention therefore to provide an effective power transfer arrangement for a moving electron beam welding system.

Another object is to provide a full power pickoff for supplying the high voltage filament and beam currents to a moving electron beam gun.

Another object is to provide a sliding contact type of power pickoff for a moving electron beam gun to provide for traverse of the same in X–Y directions within the full dimensional working area of the chamber.

A further object is to provide a sliding contact type of power pickoff for a moving electron beam gun adapted to prevent arcing and undesirable variations in welding beam intensity during traverse of the beam with respect to a fixed workpiece.

A still further object is to provide a sliding contact type of power pickoff for a moving electron beam gun having provision for shielding the elements of the sliding power pickoff against vapors generated in the welding operation.

A still further object resides in the provision of a high voltage power supply to a vacuum chamber to permit chamber free gun traverse along one or more orthogonal axes.

Still other objects, features and advantages of the present invention will become more fully apparent as the description proceeds, reference being had to the accompanying drawings which disclose the preferred embodiment of the invention. In the accompanying drawings.

Figure 1:
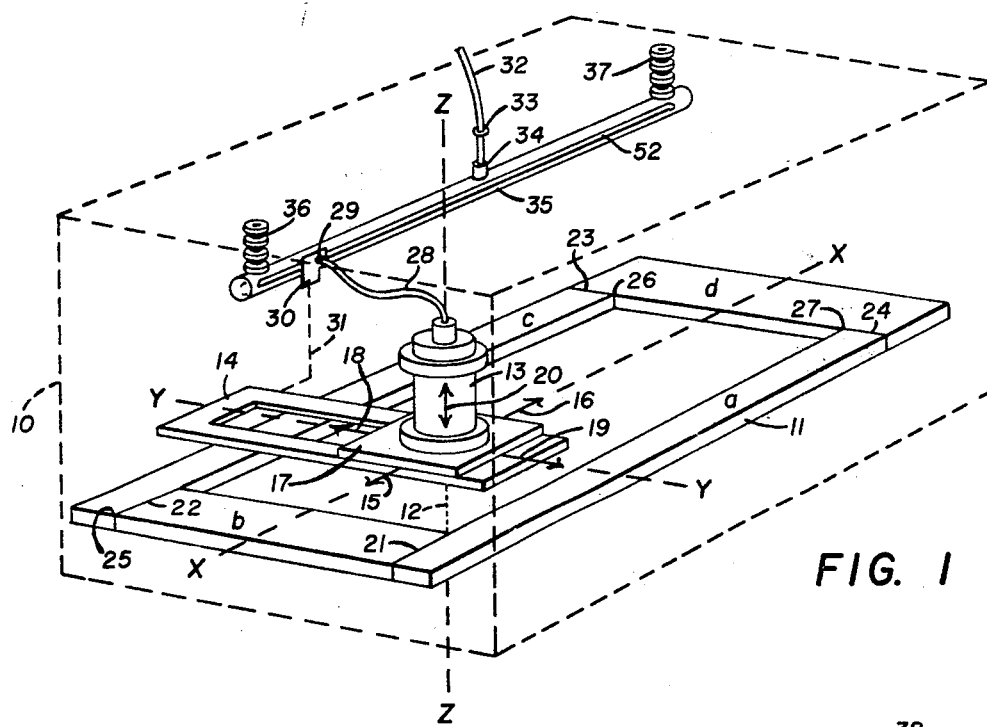
FIG. 1 is a diagrammatic view of an operative electron beam system employing the high voltage power pickoff of the present invention.

Referring now to the drawings for a more complete understanding of the invention, and first more particularly to FIG. 1, the numeral 10 designates a highly evacuated chamber in which a workpiece 11 is suitably supported by means (not shown) for welding of the same by the beam 12 of an electron beam welder 13.

A carriage 14 is mounted slidably on means (not shown) for movement along the X—X axis in either direction therealong as indicated by the arrows 15 and 16, the carriage thus being mounted for movement to opposite ends of the chamber 10. Gun 13 is mounted on a cross feed support 17 which, in turn, is slidably mounted on carriage 14 for movement along the Y—Y axis in opposite directions therealong as indicated by the arrows 18 and 19, gun 13 and its support 17 thus being mounted for movement between opposite sides of the vacuum chamber 10. Gun 13 is suitably mounted on crossfeed support 17 by means (not shown) for adjustment thereon along the Z—Z axis in opposite directions as indicated by the double headed arrow 20.

Adjustment of gun 13 along the Z—Z axis provides a means of positioning the gun with respect to the junction 21 between the workpiece parts $a$ and $b$ for optimum beam welding of these parts together at the junction. Workpiece 11 is exemplary of workpieces which substantially occupy the full working area of the vaccum chamber 10, the junction 21 being disposed within the frontmost corner of the chamber, as viewed in FIG. 1. For illustration purposes, the workpiece 11 is shown to be a framework comprising members $a$, $b$, $c$ and $d$ which, in addition to being welded at the junction 21 between parts $a$ and $b$, is also mounted for welding between the junctions 22 of parts $b$ and $c$, 23 of parts $c$ and $d$, and 24 of parts $a$ and $d$, junctions 22, 23 and 24 also being disposed in the far corners of the chamber 10.

Beam 12 is shown in position to begin a weld traverse along the junction 21 and, for this purpose, it remains only for the carriage 14 to proceed along the X—X axis in the direction of arrow 15. To perform the weld at junction 22, gun 13 is moved to the left along the Y—Y axis in the direction of arrow 18 to thus position the beam at the point 25 in the junction. Welding is then continued from this point along the junction 22 as the carriage 14 is moved along the X—X axis in the direction of arrow 16. Upon completion of the weld at junction 22, carriage 14 is continued along the X—X axis to position the beam at point 26 in junction 23 which is then welded by moving the beam along the Y—Y axis in the direction of arrow 18. The movement of the gun and its support 17 along the Y—Y axis is then reversed to move the gun in the direction of arrow 19 to position beam 16 on the point 27 in junction 24 whereupon the beam is moved along the junction to thus weld workpiece members $a$ and $d$ together. It will be understood that at each of the successive junction points 25, 26 and 27 at which welding of the respective junctions 22, 23 and 24 begins, that the gun is adjusted for optimum beam welding, as required, by adjustably moving the gun along its Z—Z axis.

Electron gun 13 may be of any type suitable for the purpose such, for example, as a Sciaky Brothers Electron Beam Gun and Supply rated at 60 kv. and 30 kw. output maximum. Normally filament and beam power for gun 13 is supplied directly from the power supply (not shown) via the cable 28. In this instance, however, the cable terminal socket 29 is connected to terminals carried by a slide 30 which has a mechanical connection with carriage 14, as depicted by the dashed line 31, whereby slide 30 moves with the carriage as the same moves along the X—X axis. Power from the supply is supplied by cable 32 which passes into chamber 10 through suitable insulation 33 and makes connection by means of its terminal socket 34 with terminals mounted on an elongated metallic shield tube 35 which internally thereof mounts the bus bars with which the brush elements of slide 30 makes electrical contact in a manner subsequently to be described.

Figure 3:
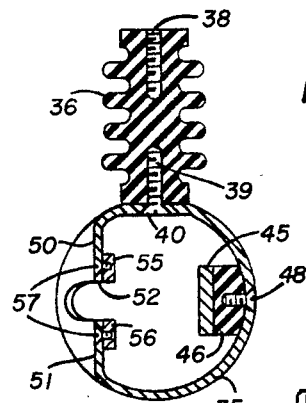
FIG. 3 is a sectional view taken through a transverse plane viewed in the direction of arrows 3—3 of FIG. 2.
Figure 5:
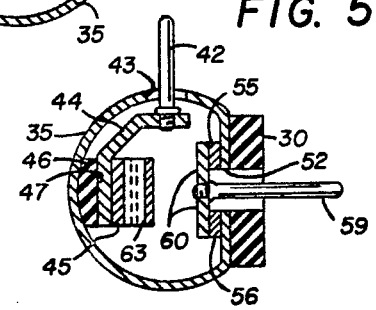
FIG. 5 is a sectional view taken through a transverse plane as viewed in the direction of arrows 5—5 of FIG. 2.

The length of tube 35 is coextensive with the travel of carriage 14 and slide 30 along the X—X axis, and the tube is mounted parallel to the X—X axis by spaced standoff shielded ceramic insulators 36 and 37 which suspend the tube from the upper wall of the chamber 10 by suitable threaded fasteners (not shown), the insulators having threaded openings 38, FIG. 3, to receive these fasteners. Each of the insulators also has a threaded opening 39, FIG. 3, at its opposite end to receive a screw 40 for securing the same to tube 35, the opening in the tube for the screw being countersunk to receive the tapered head of the screw interfittingly therewith. Tube 35 is flattened, as required, to conform to the flat end faces of the insulators, FIG. 3.

Figure 7:
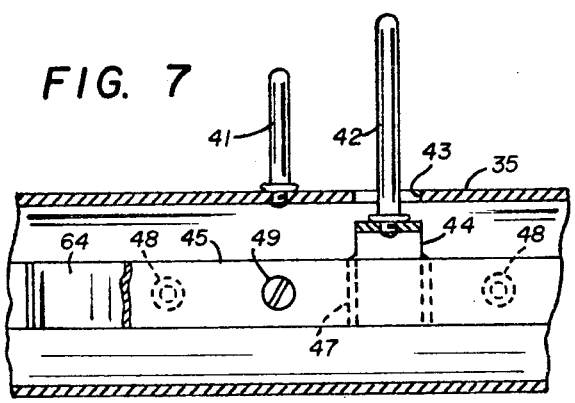
FIG. 7 is a sectional view taken through the vertically disposed longitudinal plane as viewed in the direction of arrows 7—7 of FIG. 2.

Cable terminal socket 34 engages two hard copper, rounded end pins 41 and 42 whose opposite end portions are shouldered and threaded. Pin 41 is threadedly secured directly to tube 35, as best seen in FIG. 7. Pin 42 passes through a clearance opening 43 in tube 35, the opening being sufficiently large to afford adequate electrical insulation from the tube. Internally of the tube, pin 42 is threadedly secured to a copper bracket 44, in turn, secured as by brazing to a copper bus bar 45 which extends the full length of tube 35 together with a "Micarta" member 46 for suitably mounting and electrically insulating the same with respect to tube 35. Member 46, to this end, is rounded to interfit with the internal curvature of tube 35 and has a recess 47 for receiving the bracket 44. Member 46 is secured to the tube by screws 48, FIG. 3, distributed at intervals along the length thereof, the openings in the tube for this purpose being appropriately countersunk to receive the heads of the screws. Bus bar 45, in turn, is secured to insulator member 46 by screws 49, FIG. 4, distributed at spaced intervals over the length thereof, the openings in the bus bar for this purpose being appropriately countersunk to receive the heads of the screws.

Figure 4:
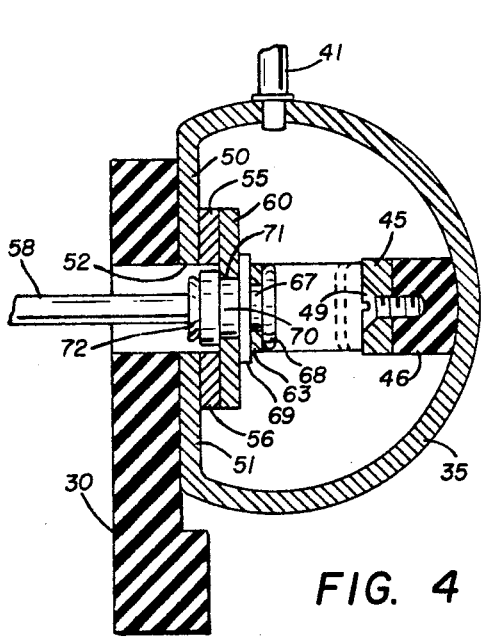
FIG. 4 is a sectional view taken through a transverse plane viewed in the direction of arrows 4—4 of FIG. 2.

The sidewall of tube 35 disposed opposite bus bar 35 is flattened to provide flat surfaces 50 and 51, FIG. 4, which lie on opposite sides of an elongated opening 52 provided in the flattened sidewall of the tube.

Figure 2:
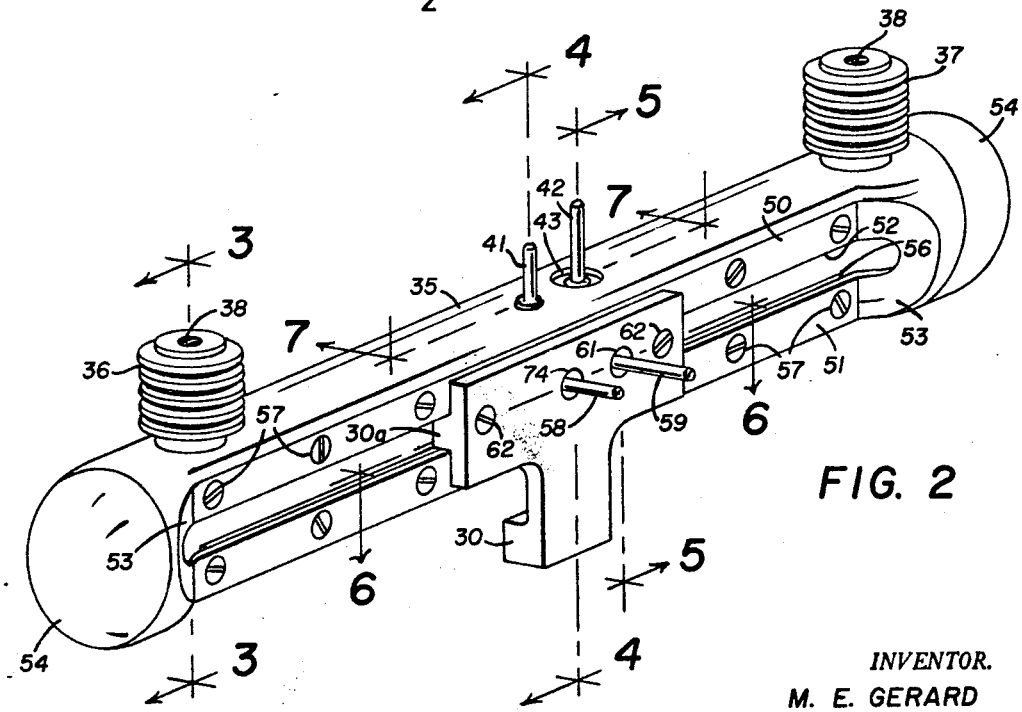
FIG. 2 is a perspective view of the power pickoff per se.
Figure 6:
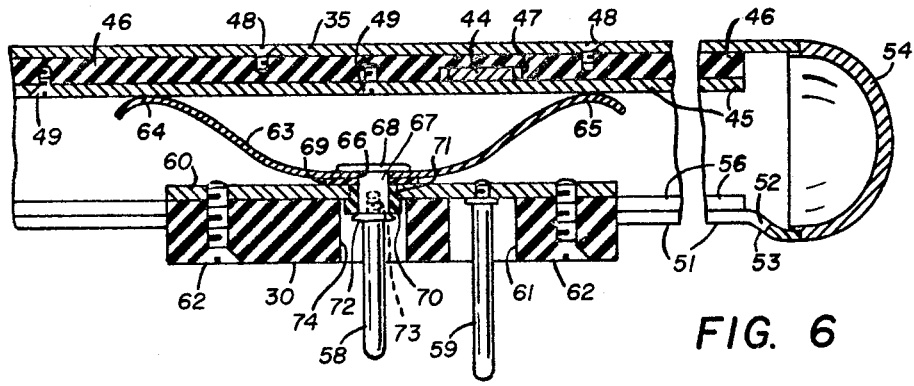
FIG. 6 is a sectional view taken through the horizontally disposed longitudinal plane as viewed in the direction of arrows 6—6 of FIG. 2.

As may be seen in FIGS. 2 and 6, the flat surfaces 50 and 51 end abruptly in angularly directed tube positions 53 which assume the full circular shape of the tube at the ends thereof which are closed by semicircular plugs 54. The tube 35 and its end plugs 54 conveniently are formed of aluminum which also serves as a suitable conductor material, the circuit from pin 41, which it is recalled is connected to the tube, being through the tube to a pair of copper bus bars 55 and 56 which extend the length of the flat faces 50 and 51 of the tube and are secured respectively to these faces as by screws 57 disposed at spaced intervals along the length thereof, the holes in the tube for this purpose being countersunk to receive the heads of the screws.

Cable terminal socket 29 engages a pair of pins 58 and 59 which are identical, respectively, to pins 41 and 42. Pin 59 is threadedly secured to a sliding contact plate 60 which bridges the bus bars 55 and 56 to make a sliding electrical contact therewith and thus complete the circuit between pins 41 and 59. This circuit may be traced from pin 41 through tube 35 and bus bars 55 and 56 in sliding engagement with plate 60, and thence to pin 59 secured to the plate.

Plate 60 may be formed of hard copper and preferably is plated with silver on the surface thereof which engages the bus bars 55 and 56. The silver surface avoids abrading and scoring of the bus bars and improves the electrical sliding contact with age since the sliding action deposits a thin coating of silver on the copper bus bars with a resultant increase in conductivity and reduced tendency of the gun 13 to arc out due to increased operating stability.

Contact plate 60 is secured to the "Micarta" slide 30, which it will be recalled, is operatively connected to gun carriage 14 for movement therewith along the X—X axis, FIG. 1. Slide member 30 has an opening 61 therein for passing pin 59 therethrough and for receiving a projecting portion of socket 29 when this is desired. Slide member 30 also has countersunk openings for receiving screws 62 for fastening the slide plate 60 thereto. As may best be seen in FIGS. 2 and 6, tongue 30a of the slide interfits slidably within the slot 52 of tube 35 and between the bus bars 55 and 56, and serves to prevent any turning movement of the slide plate 60.

Slide plate 60 is yieldably urged with the desired contact pressure into engagement with bus bars 55 and 56 by a spring copper slide member 63 whose arcuately formed end portions 64 and 65 yieldably engage bus bars 45 for sliding engagement therewith. Slide member 63 has a centrally disposed opening 66 for receiving a soft copper rivet 67, the slide member being disposed adjacent to the head 68 of the rivet, as best appears in FIG. 6. An electrically insulating washer 69 formed of a suitable material such as "Micarta" is disposed on rivet 67 between sliding members 60 and 63 to provide adequate insulation therebetween, and a shouldered "Micarta" bushing 70 is also disposed on rivet 67 and received within an opening 71 provided in sliding member 60, thereby to afford adequate insulation between the rivet and member 60. The shoulder of bushing 70 also seats against member 60, being drawn tightly into such seated relation by rivet 70 whose end 72 is upset to engage the shouldered end of the bushing. Sliding members 60 and 63 are thus held together for movement as a unitary structure while being electrically insulated from each other and also mutually providing the yieldable pressures required for sliding engagement with their respective bus bars.

Rivet 67 has a threaded bore 73, FIG. 6, for threadedly receiving pin 58 to thus secure the same to the slide assembly. The circuit thus established between pin 42 and 58 may be traced from pin 42 through bracket 44 and bus bar 45 in sliding engagement with slide contact 63, and thence by way of rivet 67 to pin 58.

A suitable opening 74 for clearance of bushing 70 is provided in slide member 30, and a projecting portion of terminal socket member 29 may be extended thereinto, as desired.

Tube opening 52, it will be noted by reference to FIG. 1, is disposed above the beam 12 and opens into the chamber 10 at right angles to the beam and the tube 35 is thus well adapted to shield the bus bars against vapors generated in the welding operation on the workpiece 11. It will also be noted that the cable 28 is called upon to flex as the gun 13 moves along the Y—Y axis and to a much lesser extent when the gun is moved adjustably along the Z—Z axis. The movement along the Y—Y axis is relatively shorter than the movement of the gun along the X—X axis and thus the necessary flexing movement of cable 28 may be held to a minimum. It will be understood, moreover, that when desired, the sliding pickoff arrangement herein disclosed for avoiding flexing of the cable as the gun moves along the X—X axis, may be extended to the Y—Y and Z—Z axes. In such case, a tube mounted on carriage 14 parallel to the Y—Y axis, would be cable connected to pins 58 and 59 on slide 30. The slide for the Y—Y axis tube would be connected to crossfeed support 17 for movement therewith and would connect electrically to a tube mounted on crossfeed support 17 parallel to the Z—Z axis, and the slide for the Z—Z axis tube would connect with the gun for movement therewith along the Z axis and the cable from the gun would connect to terminals on the Z axis slide to thus provide a power pickoff arrangement fully operative in a 3-axis system to eliminate all cable flexing therein.

From the foregoing it should now be apparent that a high voltage pickoff for a moving electron beam gun operable in a vacuum chamber has been provided which is well adapted to fulfill the aforestated objects of the invention, and while the same has been disclosed only with reference to a preferre dembodiment, it will be understood that it is the intention herein that the scope of the invention shall be limited only by the prior art and the appended claims.

What is claimed and desired to be secured by Letters Patent of the United States is:

1. A high voltage pickoff for a moving electron beam gun operable in a vacuum chamber comprising, in combination, an elongated tube disposed within the vacuum chamber in parallel with an axis of movement of the electron beam gun, said tube having an elongated sidewall slot which extends substantially the full length of the tube, a plurality of bus bars mounted within the tube substantially coextensively therewith, a pair of said bus bars being disposed respectively adjacent to and opposite said slot and electrically insulated from each other, a first pair of terminals connectable to a source for supplying filament and beam power for operation of the electron beam gun, said first terminals being electrically connected respectively to said pair of bus bars, a slide mounted on the tube for movement along said slot and operatively connected to said gun for movement therewith along said axis, said slide having mounted thereon for movement therewith a pair of contact members electrically insulated from each other and respectively disposed in yieldable and siliding contact engagement with said pair of bus bars, and a second pair of terminals mounted on said slide and electrically connectable to the gun, said second terminals being electrically connected respectively to said pair of contact members.

2. A high voltage pickoff as in claim 1, said tube being metallic and electrically insulated from said vacuum chamber, one of said pair of bus bars being secured directly to said tube in electrical contact therewith and the other of said pair of bus bars being electrically insulated from the tube.

3. A high voltage pickoff as in claim 2, said tube having a pair of shielded standoff insulators for mounting the same from a wall of said chamber.

4. A high voltage pickoff as in claim 3, said tube slot being disposed above the beam and disposed to open into the chamber in a direction at right angles to the path of the beam.

5. A high voltage pickoff as in claim 2, said first pair of terminals comprising a pair of metallic pins, one of said pins being secured directly to said tube in electrical contact therewith, said tube comprising a conductor element for electrically connecting said one of the pins to said one of the bus bars, said other of said bus bars having an insulator member disposed coextensively therewith and secured thereto, said insulator member being secured to the tube wall disposed opposite said slot, said tube having an opening disposed in spaced adjacency to said one of the pins, a bracket conductor element secured to said other of the bus bars, and the other of said pins being disposed in said opening to electrically insulate the same from the tube, said other of said pins being secured to said conductor bracket.

6. A high voltage pickoff as in claim 1, said tube having rounded closure caps for closing the ends thereof.

7. A high voltage pickoff as in claim 1, said plurality of bus bars including a third bus bar disposed adjacent said slot and on the opposite side thereof from said first mentioned adjacently disposed bus bar, said tube being metallic, said adjacently disposed bus bar being secured directly to the tube in electrical contact therewith, and one of said contact slide members comprising a plate which bridges said adjacently disposed bus bars in sliding engagement therewith.

8. A high voltage pickoff as in claim 7, the other of said contact slide members comprising a spring plate yieldably engaged slidably with said bus bar disposed opposite said slot, said spring plate yieldably urging said bridging plate into yieldable engagement with said adjacently disposed bus bars.

9. A high voltage pickoff as in claim 8, said second terminals comprising a pair of metallic pins, one of said pins being secured to said bridging plate, said bridging plate and said spring plate having rivet means electrically insulated from the bridging plate and electrically engaged with said spring plate for securing the same together as a unit, and the other of said pins being secured to said rivet means.

10. A high voltage pickoff as in claim 9, said slide comprising an insulator member having said bridging plate secured thereto and having openings for passing said pins therethrough.

References Cited

UNITED STATES PATENTS

| | | | |
|---|---|---|---|
| 2,562,979 | 8/1951 | Yingling | 191—22 |
| 3,089,042 | 5/1963 | Hickey et al. | 191—12 X |

FOREIGN PATENTS

| | | |
|---|---|---|
| 1,099,635 | 3/1955 | France. |

ARTHUR L. LA POINT, *Primary Examiner.*

S. T. KRAWCZEWICZ, *Assistant Examiner.*